US012558882B2

(12) United States Patent
Liao et al.

(10) Patent No.:  US 12,558,882 B2
(45) Date of Patent:  Feb. 24, 2026

(54) POLYOLEFIN PACKAGING MATERIAL

(71) Applicant: NAN YA PLASTICS CORPORATION, Taipei (TW)

(72) Inventors: Te-Chao Liao, Taipei (TW);
Ching-Yao Yuan, Taipei (TW);
Chih-Feng Wang, Taipei (TW);
Teng-Ko Ma, Taipei (TW)

(73) Assignee: NAN YA PLASTICS CORPORATION, Taipei (TW)

(*) Notice: Subject to any disclaimer, the term of this patent is extended or adjusted under 35 U.S.C. 154(b) by 406 days.

(21) Appl. No.: 18/296,980

(22) Filed: Apr. 6, 2023

(65) Prior Publication Data

US 2024/0190116 A1     Jun. 13, 2024

(30) Foreign Application Priority Data

Dec. 13, 2022     (TW) .................................. 111147681

(51) Int. Cl.
*B32B 27/08*       (2006.01)
*B32B 7/02*        (2019.01)
(Continued)

(52) U.S. Cl.
CPC ................ *B32B 27/32* (2013.01); *B32B 7/02* (2013.01); *B32B 7/12* (2013.01); *B32B 27/08* (2013.01); *B65D 65/40* (2013.01); *C09J 151/06* (2013.01); *B32B 2250/242* (2013.01); *B32B 2307/31* (2013.01); *B32B 2307/414* (2013.01); *B32B 2307/518* (2013.01);
(Continued)

(58) Field of Classification Search
CPC . B32B 27/32; B32B 7/12; B32B 27/08; C09J 151/06
See application file for complete search history.

(56) References Cited

U.S. PATENT DOCUMENTS 5,139,878 A      8/1992  Kim
5,340,917 A  *  8/1994  Eckman ..................... C08J 5/00
526/943

(Continued)

FOREIGN PATENT DOCUMENTS

CN         204210108 U      3/2015
CN         105895833 B      10/2018
(Continued)

*Primary Examiner* — Joanna Pleszczynska
(74) *Attorney, Agent, or Firm* — Li & Cai Intellectual Property Office

(57)     ABSTRACT

A polyolefin packaging material includes a first polyolefin polymer film, a second polyolefin polymer film, and a polyolefin bonding adhesive layer. The first polyolefin polymer film is a cast polypropylene film (CPP film). The second polyolefin polymer film is a biaxially oriented polypropylene film (BOPP film). The polyolefin bonding adhesive layer is bonded between the first polyolefin polymer film and the second polyolefin polymer film. The polyolefin bonding adhesive layer is formed of a polyolefin copolymer modified by maleic anhydride, the polyolefin copolymer is formed by copolymerization of at least two kinds of C2 to C4 olefin molecules, a graft ratio of the maleic anhydride grafted onto the polyolefin copolymer is between 0.5% and 5%, and a melt index of the polyolefin copolymer is between 1 g/10 min and 5 g/10 min.

11 Claims, 3 Drawing Sheets

100A

(51) Int. Cl.
  *B32B 7/12*          (2006.01)
  *B32B 27/32*        (2006.01)
  *B65D 65/40*       (2006.01)
  *C09J 151/06*      (2006.01)

(52) U.S. Cl.
  CPC ................. *B32B 2307/7244* (2013.01); *B32B 2307/7376* (2023.05); *B32B 2307/748* (2013.01); *B32B 2553/00* (2013.01); *B65D 2565/385* (2013.01); *B65D 2565/387* (2013.01)

(56) References Cited

U.S. PATENT DOCUMENTS

| | | | | |
|---|---|---|---|---|
| 10,818,891 | B2* | 10/2020 | Yamashita | .............. C08L 23/16 |
| 2004/0115458 | A1 | 6/2004 | Kong | |
| 2009/0022434 | A1* | 1/2009 | Chiba | .................. B32B 27/308 |
| | | | | 383/106 |
| 2009/0258243 | A1* | 10/2009 | Maruyama | .............. C08L 23/10 |
| | | | | 525/240 |
| 2013/0157051 | A1 | 6/2013 | Nagano et al. | |
| 2013/0209868 | A1* | 8/2013 | Suzuta | ................... B32B 27/32 |
| | | | | 429/176 |
| 2014/0004336 | A1 | 1/2014 | Dou | |

| | | | | |
|---|---|---|---|---|
| 2016/0167347 | A1 | 6/2016 | Jung et al. | |
| 2019/0022989 | A1* | 1/2019 | Ono | ........................ B32B 27/32 |
| 2019/0036090 | A1* | 1/2019 | Hirota | ................... C08F 255/04 |
| 2021/0194084 | A1* | 6/2021 | Nakajima | .......... H01M 50/129 |
| 2021/0260856 | A1* | 8/2021 | Nakanishi | ............. B32B 27/306 |
| 2021/0347148 | A1 | 11/2021 | Yamada et al. | |

FOREIGN PATENT DOCUMENTS

| | | |
|---|---|---|
| CN | 108943932 A | 12/2018 |
| CN | 111806015 A | 10/2020 |
| EP | 3763522 A1 | 1/2021 |
| JP | 57182435 A | 11/1982 |
| JP | 2000248246 A | 9/2000 |
| JP | 2005178898 A | 7/2005 |
| JP | 2012188638 A | 10/2012 |
| JP | 2013112736 A | 6/2013 |
| JP | 2015171778 A | 10/2015 |
| JP | 2017224485 A | 12/2017 |
| JP | 201853180 A | 4/2018 |
| JP | 20196106 A | 1/2019 |
| JP | 2020203466 A | 12/2020 |
| JP | 202179597 A | 5/2021 |
| KR | 1020200082510 A | 7/2020 |
| KR | 1020210063525 A | 6/2021 |
| WO | WO2020045629 A1 | 3/2020 |

* cited by examiner

100A

100B

100C

100D

200

POLYOLEFIN PACKAGING MATERIAL

CROSS-REFERENCE TO RELATED PATENT APPLICATION

This application claims the benefit of priority to Taiwan Patent Application No. 111147681, filed on Dec. 13, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a packaging material, and more particularly to a polyolefin packaging material.

BACKGROUND OF THE DISCLOSURE

In the related art, a conventional aluminum-plastic film packaging material 200 usually adopts a composite material composed of a polyolefin polymer film a, an aluminum foil b, and a polyester polymer film c as shown in FIG. 5. However, the conventional aluminum-plastic film packaging material is composed of heterogeneous materials, and an adhesive layer which bonds two adjacent layers together is usually a polyester glue that is not of the same material as the polyolefin or the aluminum foil. Accordingly, the conventional aluminum-plastic film packaging material cannot be directly recycled and reused. In addition, since the conventional aluminum-plastic film packaging material adopts the aluminum foil as a gas barrier, the packaging material is opaque in appearance, which limits the application of the packaging material and causes the packaging material to be inapplicable to packaging products with special requirements.

SUMMARY OF THE DISCLOSURE

In response to the above-referenced technical inadequacies, the present disclosure provides a polyolefin packaging material.

In one aspect, the present disclosure provides a polyolefin packaging material that includes a first polyolefin polymer film, a second polyolefin polymer film, and a polyolefin bonding adhesive layer. The first polyolefin polymer film is a cast polypropylene film (CPP film). The second polyolefin polymer film is a biaxially oriented polypropylene film (BOPP film). The polyolefin bonding adhesive layer is bonded between the first polyolefin polymer film and the second polyolefin polymer film. The polyolefin bonding adhesive layer is formed of a polyolefin copolymer modified by maleic anhydride, the polyolefin copolymer is formed by copolymerization of at least two kinds of C2 to C4 olefin molecules, a graft ratio of the maleic anhydride grafted onto the polyolefin copolymer is between 0.5% and 5%, and a melt index of the polyolefin copolymer is between 1 g/10 min and 5 g/10 min.

In certain embodiments, the first polyolefin polymer film has a visible light transmittance of between 80% and 99%, and a haze of between 5% and 30%.

In certain embodiments, in the polyolefin bonding adhesive layer, raw materials for forming the polyolefin copolymer are further limited to C3 olefin molecules and C4 olefin molecules.

In certain embodiments, the second polyolefin polymer film is the biaxially oriented polypropylene film that has undergone an evaporation process, and has a water vapor transmission rate (WVTR) or an oxygen transmission rate (OTR) of not greater than 1 g/m² day.

In certain embodiments, the first polyolefin polymer film and the second polyolefin polymer film are bonded together through the polyolefin bonding adhesive layer to have a peeling strength of not less than 4.5 N/15 mm.

In certain embodiments, the polyolefin packaging material further includes another polyolefin bonding adhesive layer and a third polyolefin polymer film. The another polyolefin bonding adhesive layer is formed of another polyolefin copolymer modified by maleic anhydride, and the another polyolefin bonding adhesive layer is formed on a surface of the second polyolefin polymer film that is away from the first polyolefin polymer film. The third polyolefin polymer film is another biaxially oriented polypropylene film that has not undergone an evaporation process, and the third polyolefin polymer film is formed on a surface of the another polyolefin bonding adhesive layer away from the first polyolefin polymer film. The another polyolefin bonding adhesive layer is configured to bond the second polyolefin polymer film and the third polyolefin polymer film together.

In certain embodiments, the first polyolefin polymer film includes a base film material, and further includes a first laminated film material and a second laminated film material that are respectively formed on two opposite side surfaces of the base film material. The first laminated film material is a heat-sealing layer facing an inner side of the polyolefin packaging material, and the second laminated film material is bonded to the polyolefin bonding adhesive layer.

In certain embodiments, a material composition of the base film material includes a propylene block polymer and a polyolefin elastomer. Based on a total weight of the base film material being 100 wt %, a content of the propylene block polymer is between 50 wt % and 90 wt %, and a content of the polyolefin elastomer is between 1 wt % and 30 wt %.

In certain embodiments, the propylene block polymer includes blocks composed of ethylene propylene elastic rubber, and a weight percent concentration of the ethylene propylene elastic rubber in the propylene block polymer is between 10% and 30%.

In certain embodiments, a material composition of the first laminated film material includes a homo polypropylene (homo PP) and a random polypropylene (rand PP). The homo polypropylene is a homo polymer that is polymerized from pure propylene. The random polypropylene is a random copolymer, which is copolymerized by propylene and ethylene. Based on a total weight of the first laminated film material being 100 wt %, a content of the homo polypropylene is between 10 wt % and 60 wt %, and a content of the random polypropylene is between 40 wt % and 90 wt %.

In certain embodiments, a material composition of the second laminated film material includes another homo polypropylene and another random polypropylene. Based on a total weight of the second laminated film material being 100 wt %, a content of the another homo polypropylene is between 10 wt % and 60 wt %, and a content of the another random polypropylene is between 40 wt % and 90 wt %.

In certain embodiments, a thickness ratio among the first laminated film material, the base film material, and the second laminated film material is between 10:60:10 and 20:80:20.

Therefore, in the polyolefin packaging material provided by the present disclosure, by virtue of "a first polyolefin polymer film being a cast polypropylene film (CPP film); a second polyolefin polymer film being a biaxially oriented polypropylene film (BOPP film); and a polyolefin bonding adhesive layer being bonded between the first polyolefin polymer film and the second polyolefin polymer film; in which the polyolefin bonding adhesive layer is formed of a polyolefin copolymer modified by maleic anhydride, the polyolefin copolymer is formed by copolymerization of at least two kinds of C2 to C4 olefin molecules, a graft ratio of the maleic anhydride grafted onto the polyolefin copolymer is between 0.5% and 5%, and a melt index of the polyolefin copolymer is between 1 g/10 min and 5 g/10 min," the polyolefin packaging material can be directly recycled and reused without special separation operations.

Furthermore, the polyolefin packaging material provided by the present disclosure has the polyolefin bonding adhesive layer formed by the polyolefin copolymer modified by maleic anhydride, so that the first polyolefin polymer film (CPP film) and the second polyolefin polymer film (evaporated BOPP film) can have better bonding strength therebetween, and the polyolefin packaging material can have good transparency and impact resistance, thus replacing conventional packaging materials such as aluminum-plastic film laminates.

Further, the polyolefin packaging material of the present disclosure can be applied to industrial packaging, electronic packaging, and food packaging.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
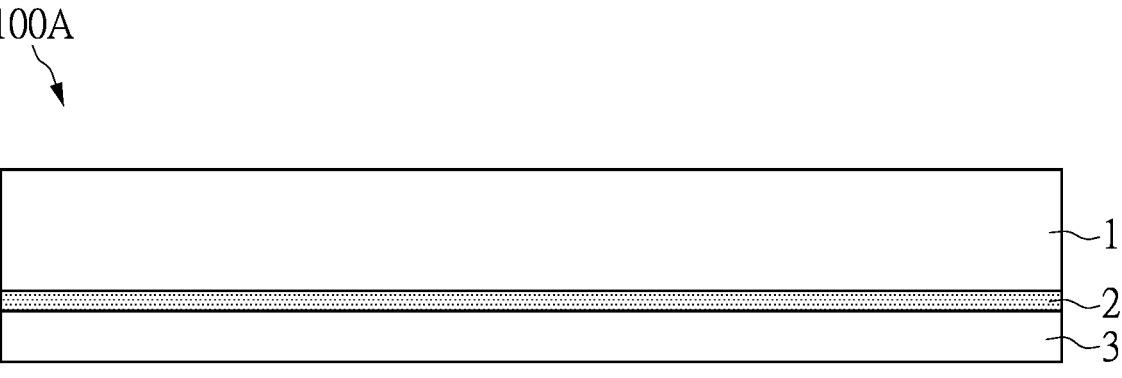
FIG. 1 is a schematic view of a polyolefin packaging material according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1, a first embodiment of the present disclosure provides a polyolefin packaging material 100A that includes: a first polyolefin polymer film 1, a polyolefin bonding adhesive layer 2, and a second polyolefin polymer film 3 that are stacked sequentially from top to bottom. The polyolefin bonding adhesive layer 2 is formed between the first polyolefin polymer film 1 and the second polyolefin polymer film 3, and is configured to bond the first polyolefin polymer film 1 and the second polyolefin polymer film 3 together. Since all the film layers in the laminated structure of the polyolefin packaging material 100A are made of materials mainly composed of polyolefin (e.g., more than 80 wt % of the film layer being composed of polyolefin), the polyolefin packaging material 100A can be directly recycled and reused without special separation processes. In the present embodiment, the first polyolefin polymer film 1 is a cast polypropylene film (CPP film, also known as an unstretched polypropylene film), which enables the polyolefin packaging material 100A to have impact resistance.

The first polyolefin polymer film 1 has a thickness between 40 μm (micrometers) and 120 μm, preferably between 50 μm and 110 μm, and more preferably between 60 μm and 100 μm.

Furthermore, a visible light transmittance of the first polyolefin polymer film 1 is between 80% and 99%, and preferably between 90% and 99%. A haze of the first polyolefin polymer film 1 is between 5% and 30%, and preferably between 10% and 20%. It should be noted that the visible light transmittance (also called transparency) and the haze are measured according to ASTM D1003.

The polyolefin bonding adhesive layer 2 is formed of a polyolefin copolymer modified by maleic anhydride.

The polyolefin copolymer can be, for example, formed by copolymerization of at least two kinds of C2 to C4 olefin molecules. It should be understood by those skilled in the art that the C2 olefin molecule is ethylene (PE), the C3 olefin molecule is propylene (PP), and the C4 olefin molecule is butylene, such as 1-butylene. For example, the raw materials for forming the polyolefin copolymer can be C2 olefin molecules and C3 olefin molecules, C2 olefin molecules and C4 olefin molecules, C3 olefin molecules and C4 olefin molecules, or C2 to C4 olefin molecules. Preferably, the raw materials for forming the polyolefin copolymer can be, but not limited to, C3 olefin molecules and C4 olefin molecules. In addition, a weight ratio of the C3 olefin molecules to the C4 olefin molecules can be, for example, from 30:70 to 70:30, and preferably from 40:60 to 60:40, but the present disclosure is not limited thereto. It is worth mentioning that the polyolefin copolymer of the present embodiment is formed by the copolymerization reaction of at least two kinds of C2 to C4 olefin molecules that enable the polyolefin bonding adhesive layer 2 to have high transparency and good bonding ability.

Further, in the present embodiment, the polyolefin copolymer is modified by the maleic anhydride (MAH). The polyolefin copolymer modified by the maleic anhydride can have carboxyl groups (—COOH), so that the polarity of the polyolefin copolymer can be greatly improved. The polyolefin copolymer modified by the maleic anhydride can have better water solubility and bonding ability compared to an unmodified polyolefin copolymer, so that the polyolefin copolymer modified by the maleic anhydride is more suitable for forming an adhesive layer.

The maleic anhydride can be, for example, grafted onto the polyolefin copolymer. More specifically, the maleic anhydride can be, for example, melt-grafted onto the polyolefin copolymer. The melt grafting modification can be performed in a single-screw extruder, a twin-screw extruder, or a rheometer, and is preferably performed in a twin-screw extruder.

In the polyolefin bonding adhesive layer 2, a content of the polyolefin copolymer is not less than 90 wt %, and preferably not less than 95 wt %. In addition, a graft ratio of the maleic anhydride grafted onto the polyolefin copolymer is preferably between 0.5% and 5%.

It is worth mentioning that, in the present embodiment, the graft ratio of the maleic anhydride needs to be controlled between 0.5% and 5% in order to provide better bonding ability. If the graft ratio of the maleic anhydride is lower than 0.5%, the bonding ability of the polyolefin bonding adhesive layer 2 will be deteriorated. Conversely, if the graft ratio of the maleic anhydride is higher than 5%, the polyolefin bonding adhesive layer 2 will be too rigid after being bonded between the first polyolefin polymer film 1 and the second polyolefin polymer film 3, so that the polyolefin bonding adhesive layer 2 is not suitable for being used on packaging materials.

It should be noted that the "graft ratio" of the maleic anhydride referred to herein can be analyzed by Fourier-transform infrared spectroscopy (FTIR). Fourier-transform infrared spectroscopy can not only qualitatively analyze whether or not the maleic anhydride is grafted onto the molecular chain of the polyolefin copolymer, but also quantify the graft ratio of the maleic anhydride. It can be seen from an infrared spectrum that a maleic anhydride grafted substance has obvious absorption peaks at 1725 cm$^{-1}$ and 1790 cm$^{-1}$, and the absorption peaks are the characteristic peaks of carboxyl groups in the maleic anhydride. In addition, a quantitative analysis of the graft ratio of the maleic anhydride can be performed, for example, according to the Lambert-Beer law.

Further, in the present embodiment, a melt index (MI) of the polyolefin copolymer modified by the maleic anhydride is controlled between 1 g/10 min and 5 g/10 min, preferably between 2 g/10 min and 4 g/10 min, and more preferably between 3 g/10 min and 4 g/10 min.

It is worth mentioning that, in the present embodiment, the melt index of the polyolefin copolymer needs to be controlled between 1 g/10 min and 5 g/10 min, so that the polyolefin bonding adhesive layer 2 can have better bonding ability and transparency, and can have better appearance (i.e., no obvious streaks observed on a flat surface of the polyolefin packaging material) and comfortable tactile sensation. If the melt index of the polyolefin copolymer exceeds the above-mentioned range, the transparency of the polyolefin bonding adhesive layer 2 may be reduced, the bonding ability of the polyolefin bonding adhesive layer 2 may be poor, streaks on the surface of the polyolefin packaging material may occur, and/or the tactile sensation of the polyolefin packaging material may be uncomfortable.

It should be noted that the "melt index (MI)" referred to herein refers to a weight of the polyolefin copolymer passing through a standard die every 10 minutes on a melt flow velocimeter, and the unit of the melt index is g/10 min. The melt index represents the fluidity of a resin material in a molten state. The larger the melt index is, the smaller the molecular weight of the resin material is, and the better the fluidity of the resin material is. Conversely, the larger the molecular weight of the resin material is, the more difficult it is for the molecular chain to move; further, the smaller the melt index is, the worse the fluidity of the resin material is. In the present embodiment, the melt index is measured according to ASTM D1238 under the conditions of 190° C. and a load of 2.16 kg.

In terms of thickness, the polyolefin bonding adhesive layer 2 has a thickness between 2 μm and 20 μm, preferably between 3 μm and 15 μm, and more preferably between 5 μm and 10 μm.

It is worth mentioning that the preparation of the polyolefin copolymer can be carried out in the presence of a peroxidant (a content of the peroxidant is from 0.3% to 0.6%). The polyolefin copolymer is pelletized by a twin-screw extruder and melt-grafted by the maleic anhydride during an extruding process of the twin-screw extruder. In addition, the melt index of the polyolefin copolymer can also be controlled.

In addition, the polyolefin copolymer that is pelletized can, for example, be dissolved in a solvent and coated on a surface of a substrate (i.e., the first polyolefin polymer film 1 or the second polyolefin polymer film 3), and the polyolefin copolymer is formed as the polyolefin bonding adhesive layer 2 after removing the solvent, but the present disclosure is not limited thereto.

Referring further to FIG. 1, the second polyolefin polymer film 3 is formed on a surface of the polyolefin bonding adhesive layer 2 away from the first polyolefin polymer film 1 (i.e., the lower surface of the polyolefin bonding adhesive layer 2).

In the present embodiment, the second polyolefin polymer film 3 is a biaxially oriented polypropylene film (BOPP film) covered by inorganic materials through an evaporation process, so that the second polyolefin polymer film 3 can provide gas barrier properties (i.e., water vapor barrier property and oxygen barrier property) required for packaging materials, and maintain a certain degree of transparency. In addition, the inorganic materials can be, for example but not limited to, $SiO_2$ and $Al_2O_3$, which impart the gas barrier properties to the biaxially oriented polypropylene film without affecting the transparency of the BOPP film. The second polyolefin polymer film 3 can replace the aluminum foil substrate used in conventional packaging materials.

In terms of thickness, the second polyolefin polymer film 3 has a thickness between 10 μm and 40 μm, preferably between 10 μm and 30 μm, and more preferably between 15 μm and 25 μm.

In terms of barrier properties, the second polyolefin polymer film 3 has a water vapor transmission rate (WTR) of not greater than 1 g/m² day and an oxygen transmission rate (OTR) of not greater than 1 g/m² day. Among them, the water vapor transmission rate can be measured, for example, according to the GB/T 1037-1988 standard, and the oxygen transmission rate can be measured, for example, according to the GB/T 19789-2005 standard.

According to the aforementioned technical solution, in the polyolefin packaging material 100A of the first embodiment of the present disclosure, the first polyolefin polymer film 1 (CPP film) and the second polyolefin polymer film 3 (evaporated BOPP film) can have better bonding strength therebetween by virtue of the polyolefin bonding adhesive layer 2 being formed of the polyolefin copolymer that is modified by maleic anhydride, and the polyolefin packaging material 100A can have good transparency and impact resistance. In addition, since all the film layers in the laminated structure of the polyolefin packaging material 100A are mainly composed of polyolefin materials, the polyolefin packaging material 100A can be directly recycled and reused without special sorting processes. The polyolefin packaging material 100A of the embodiment of the present disclosure can be applied to industrial packaging, electronic packaging, and food packaging. The technical solution provided by the embodiments of the present disclosure simplifies materials used in the bonding process by adopting a single material combination, so as to replace the aluminum-plastic film laminated materials used in conventional packaging materials. The polyolefin packaging material 100A of the embodiments of the present disclosure not only has improved transparency, but also can be recycled or made into fuel rods after use, thus meeting the requirement of eco-friendliness.

In order to prove that the polyolefin packaging material provided by the present disclosure has excellent bonding strength, good tactile sensation, and no obvious abnormal appearance (i.e., no visible streaks) through the polyolefin bonding adhesive layer that is formed by the polyolefin copolymer modified by maleic anhydride, Exemplary Examples and Comparative Examples are described below. Among them, the Exemplary Examples are groups that can prove the technical effects of the present disclosure, and the Comparative Examples are groups with poor test results. However, the following Exemplary Examples are only to aid in the understanding of the present disclosure, and the scope of the present disclosure is not limited to the contents of these Exemplary Examples.

Exemplary Example 1: A polyolefin bonding adhesive is firstly prepared, and the polyolefin bonding adhesive is formed of a polyolefin copolymer modified by maleic anhydride. The polyolefin copolymer is formed by copolymerization of propylene (i.e., C3 olefin) and butylene (i.e., C4 olefin). The content of the polyolefin copolymer is 99.5 wt %. The graft ratio of the maleic anhydride grafted onto the polyolefin copolymer is 0.5%. The melt index of the polyolefin copolymer is 3.2 g/10 min. Then, the polyolefin bonding adhesive of Exemplary Example 1 is used to bond a cast polypropylene film (CPP film) and an evaporated biaxially oriented polypropylene film (BOPP film) together, so as to form a polyolefin packaging material. The thickness of the CPP film is about 80 μm. The thickness of the BOPP film is about 20 μm. The thickness of the polyolefin bonding adhesive is around from 7 μm to 8 μm. After bonding, the polyolefin packaging material of Exemplary Example 1 has a haze of 6%, good tactile sensation, no obvious streaks in appearance, and a peeling strength of 5.2 N/15 mm between the CPP film and the BOPP film.

Exemplary Example 2: A polyolefin bonding adhesive is firstly prepared. The polyolefin bonding adhesive is formed of a polyolefin copolymer modified by maleic anhydride. The polyolefin copolymer is formed by copolymerization of propylene (i.e., C3 olefin) and butylene (i.e., C4 olefin). The content of the polyolefin copolymer is 97 wt %. The graft ratio of the maleic anhydride grafted onto the polyolefin copolymer is 3%. The melt index of the polyolefin copolymer is 3.1 g/10 min. Then, the polyolefin bonding adhesive of Exemplary Example 2 is used to bond a cast polypropylene film (CPP film) and an evaporated biaxially oriented polypropylene film (BOPP film) together, so as to form a polyolefin packaging material. The remaining conditions of Exemplary Example 2 are the same as that of Exemplary Example 1. After bonding, the polyolefin packaging material of Exemplary Example 2 has a haze of 7%, good tactile sensation, no obvious streaks in appearance, and a peeling strength of 5.7 N/15 mm between the CPP film and the BOPP film.

Exemplary Example 3: A polyolefin bonding adhesive is firstly prepared. The polyolefin bonding adhesive is formed of a polyolefin copolymer modified by maleic anhydride. The polyolefin copolymer is formed by copolymerization of propylene (i.e., C3 olefin) and butylene (i.e., C4 olefin). The content of the polyolefin copolymer is 95 wt %. The graft ratio of the maleic anhydride grafted onto the polyolefin copolymer is 5%. The melt index of the polyolefin copolymer is 3.4 g/10 min. Then, the polyolefin bonding adhesive of Exemplary Example 3 is used to bond a cast polypropylene film (CPP film) and an evaporated biaxially oriented polypropylene film (BOPP film) together, so as to form a polyolefin packaging material. The remaining conditions of Exemplary Example 3 are the same as that of Exemplary Example 1. After bonding, the polyolefin packaging material of Exemplary Example 3 has a haze of 6.5%, good tactile sensation, no obvious streaks in appearance, and a peeling strength of 4.9 N/15 mm between the CPP film and the BOPP film.

Comparative Example 1: A polyolefin bonding adhesive is firstly prepared. The polyolefin bonding adhesive is formed of a polyolefin copolymer modified by maleic anhydride. The polyolefin copolymer is formed by copolymerization of propylene (i.e., C3 olefin) and butylene (i.e., C4 olefin). The content of the polyolefin copolymer is 95 wt %. The graft ratio of the maleic anhydride grafted onto the polyolefin copolymer is 6%. The melt index of the polyolefin copolymer is 3.5 g/10 min. Then, the polyolefin bonding adhesive of Comparative Example 1 is used to bond a cast polypropylene film (CPP film) and an evaporated biaxially oriented polypropylene film (BOPP film) together, so as to form a polyolefin packaging material. The remaining conditions of Comparative Example 1 are the same as that of Exemplary Example 1. After bonding, the polyolefin packaging material of Comparative Example 1 has a haze of 7.5%, no obvious streaks in appearance, and a peeling strength of 4.8 N/15 mm between the CPP film and the BOPP film. However, the tactile sensation of the polyolefin packaging material is poor, which may be due to the graft ratio of the maleic anhydride being greater than 5%, so that the polyolefin packaging material becomes too rigid.

Comparative Example 2: A polyolefin bonding adhesive is firstly prepared. The polyolefin bonding adhesive is formed of a polyolefin copolymer modified by maleic anhydride. The polyolefin copolymer is formed by copolymerization of ethylene (i.e., C2 olefin) and butylene (i.e., C4 olefin). The content of the polyolefin copolymer is 97 wt %. The graft ratio of the maleic anhydride grafted onto the polyolefin copolymer is 3%. The melt index of the polyolefin copolymer is 3.2 g/10 min. Then, the polyolefin bonding adhesive of Comparative Example 2 is used to bond a cast polypropylene film (CPP film) and an evaporated biaxially oriented polypropylene film (BOPP film) together, so as to form a polyolefin packaging material. The remaining conditions of Comparative Example 2 are the same as that of Exemplary Example 1. After bonding, the polyolefin packaging material of Comparative Example 2 has a haze of 15%. The tactile sensation of the polyolefin packaging material is normal. The appearance of the polyolefin packaging material cannot be observed due to the excessive haze. A peeling strength between the CPP film and the BOPP film is 4.6 N/15 mm. It can be observed that, the haze of the polyolefin packaging material of Comparative Example 2 is too high (i.e., greater than 10%), the tactile sensation of the polyolefin packaging material is poor, and the appearance of the polyolefin packaging material cannot be observed as having streaks or not. One possible reason is that the carbon number difference between ethylene (i.e., C2 olefin) and butylene (i.e., C4 olefin) used in the polyolefin copolymer is large, resulting in a large difference in refractive index between the two materials (i.e., ethylene and butylene), so that the polyolefin packaging material has high haze and low transparency.

Comparative Example 3: A polyolefin bonding adhesive is firstly prepared. The polyolefin bonding adhesive is formed of a pure polyolefin copolymer. The polyolefin copolymer is formed by copolymerization of propylene (i.e., C3 olefin) and butylene (i.e., C4 olefin). The content of the polyolefin copolymer is 100 wt %, without any maleic anhydride grafted onto the polyolefin copolymer. The melt index of the polyolefin copolymer is 5 g/10 min. Then, the polyolefin bonding adhesive of Comparative Example 3 is used to bond a cast polypropylene film (CPP film) and an evaporated biaxially oriented polypropylene film (BOPP film) together, so as to form a polyolefin packaging material.

The remaining conditions of Comparative Example 3 are the same as that of Exemplary Example 1. After bonding, the polyolefin packaging material of Comparative Example 3 has a haze of 6.2%, good tactile sensation, no obvious streaks in appearance, and a peeling strength of 3.1 N/15 mm between the CPP film and the BOPP film. The peeling strength between the CPP film and the BOPP film of Comparative Example 3 is low, which may be due to the fact that the polyolefin copolymer has not been modified by maleic anhydride, thereby causing the adhesive force to be insufficient.

Comparative Example 4: A polyolefin bonding adhesive is firstly prepared. The polyolefin bonding adhesive is formed of a polyolefin copolymer modified by maleic anhydride. The polyolefin copolymer is formed by copolymerization of propylene (i.e., C3 olefin) and butylene (i.e., C4 olefin). The content of the polyolefin copolymer is 97 wt %. The graft ratio of the maleic anhydride grafted onto the polyolefin copolymer is 3%. The melt index of the polyolefin copolymer is 7 g/10 min. Then, the polyolefin bonding adhesive of Comparative Example 4 is used to bond a cast polypropylene film (CPP film) and an evaporated biaxially oriented polypropylene film (BOPP film) together, so as to form a polyolefin packaging material. The remaining conditions of Comparative Example 4 are the same as that of Exemplary Example 1. After bonding, the polyolefin packaging material of Comparative Example 4 has a haze of 6.1%, good tactile sensation, severe streaks in appearance, and a peeling strength of 5.0 N/15 mm between the CPP film and the BOPP film. Apparently, the polyolefin packaging material of Comparative Example 4 has severe streaks in appearance and is a defective product. The reason may be that the melt index of the polyolefin copolymer is too high (i.e., greater than 5 g/10 min), so that when the polyolefin adhesive layer is formed, serious flow marks are produced.

It should be noted that the "peeling strength" mentioned in the present disclosure refers to a maximum force required per unit width when bonded materials are peeled apart from a contact surface of the bonded materials. The testing instrument used to measure the peeling strength is a universal testing machine. An indication error of the instrument is within plus or minus 1% of an actual value. The test conditions include an ambient temperature of 23° C. plus or minus 2° C., a relative humidity of 50% plus or minus 5%, and a storage time greater than 4 hours. The sample preparation includes taking an appropriate amount of a sample; and respectively removing 50 mm from both ends of the sample in a widthwise direction of the sample. Five samples are cut evenly, and each of the samples has a transverse width of 15.0 mm plus or minus 0.1 mm and a length of 200 mm. The testing process is to clamp both ends of a peeled part of the sample in the upper and lower clamps of the testing instrument, so that a longitudinal axis of the peeled part of the sample coincides with a center connecting line of the upper and lower clamps, and the tightness of the clamps is adjusted to be suitable for testing. The test speed is 300 mm/min plus or minus 30 mm/min, and a peeling force curve during a peeling process of the sample is recorded. The arithmetic mean values of the longitudinal and transverse peeling strengths of each group of the samples are respectively calculated to obtain the test results, and two significant figures are taken. The unit of the peeling strength is expressed in N/15 mm.

The evaluation process of the tactile sensation on the packaging material is that a tester touches the surface of the biaxially oriented polypropylene film of the packaging material. If the tactile sensation of the tester on the surface of the film is smooth, the tactile sensation is recorded as good. If the tactile sensation of the tester on the surface of the film is rough, the tactile sensation is recorded as poor. If the tactile sensation of the tester on the surface of the film is between smooth and rough, the tactile sensation is recorded as normal. The evaluation process of the appearance of the packaging material is to observe the surface of the biaxially oriented polypropylene film of the packaging material by the naked eyes (at a distance of substantially 30 cm) of a tester. If no obvious streaks can be observed, the appearance is recorded as having no streaks. If obvious streaks can be observed, the appearance is recorded as having severe streaks. If the haze of the packaging material is too high, the appearance is recorded as unobservable.

TABLE 1

| | | Exemplary Example 1 | Exemplary Example 2 | Exemplary Example 3 | Comparative Example 1 | Comparative Example 2 | Comparative Example 3 | Comparative Example 4 |
|---|---|---|---|---|---|---|---|---|
| conditions of polyolefin bonding adhesive | propylene (C3 olefin)/ butylene (C4 olefin) | 99.5 wt % | 97 wt % | 95 wt % | 95 wt % | — | 100 wt % | 97 wt % |
| | ethylene (C2 olefin)/ butylene (C4 olefin) | — | — | — | — | 97 wt % | — | — |
| | graft ratio | 0.5% | 3% | 5% | 6% | 3% | — | 3% |
| | melt index | 3.2 g/ 10 min | 3.1 g/ 10 min | 3.4 g/ 10 min | 3.5 g/ 10 min | 3.2 g/ 10 min | 5 g/ 10 min | 7 g/ 10 min |
| test results of packaging material | haze | 6% | 7% | 6.5% | 7.5% | 15% | 6.2% | 6.1% |
| | tactile sensation | good | good | good | poor | normal | good | good |
| | appearance | no streaks | no streaks | no streaks | no streaks | unobserv- able | no streaks | severe streaks |
| | peeling strength | 5.2N/ 15 mm | 5.7N/ 15 mm | 4.9N/ 15 mm | 4.8N/ 15 mm | 4.6N/ 15 mm | 3.1N/ 15 mm | 5.0N/ 15 mm |

It can be known from the above experimental data that in Exemplary Example 1 to Exemplary Example 3, the graft ratios of the maleic anhydride grafted onto the polyolefin copolymers are respectively controlled between 0.5% and 5%, the melt indices of the polyolefin copolymers are respectively controlled between 1 g/10 min and 5 g/10 min, and the raw materials for forming the polyolefin copolymers also have similar refractive indices. According to the above experimental data, the polyolefin packaging materials of Exemplary Example 1 to Exemplary Example 3 all have relatively low haze, good tactile sensation, no obvious streaks in appearance, and good peeling strength between the CPP film and the BOPP film. Exemplary Example 1 to Exemplary Example 3 can prove the technical effects (adhesion and transparency) to be achieved by the present disclosure.

In Comparative Example 1, the graft ratio of the maleic anhydride is greater than 5%, so that the polyolefin packaging material becomes too rigid, and the tactile sensation of the polyolefin packaging material is poor.

In Comparative Example 2, the haze of the polyolefin packaging material is too high (i.e., greater than 10%), the tactile sensation of the polyolefin packaging material is poor, and the appearance of the polyolefin packaging material is unable to be observed as having streaks or not. The possible reason is that the carbon number difference between ethylene (i.e., C2 olefin) and butylene (i.e., C4 olefin) used in the polyolefin copolymer is large, resulting in a large difference in refractive index between the two materials (e.g., ethylene and butylene). Therefore, the polyolefin packaging material has high haze and low transparency.

In Comparative Example 3, the peeling strength between the CPP film and the BOPP film is low, which may be because the polyolefin copolymer has not been modified by maleic anhydride. Therefore, the adhesive force there-between is insufficient.

In Comparative Example 4, the polyolefin packaging material has severe streaks in appearance and is a defective product, which may be because the melt index of the polyolefin copolymer is too high (i.e., greater than 5 g/10 min). Therefore, when the polyolefin adhesive layer is formed, serious flow marks are produced.

Second Embodiment

Figure 2:
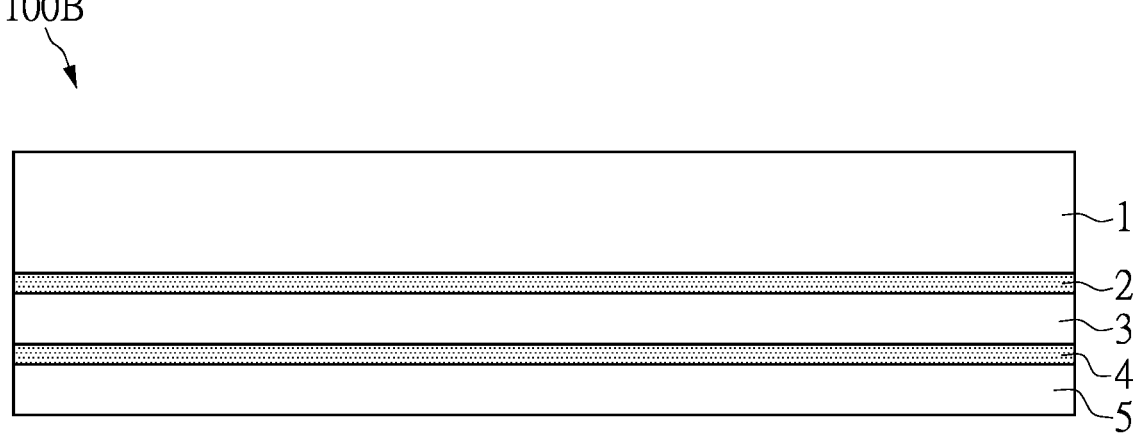
FIG. 2 is a schematic view of a polyolefin packaging material according to a second embodiment of the present disclosure.

Referring to FIG. 2, a second embodiment of the present disclosure provides a polyolefin packaging material 100B that includes: a first polyolefin polymer film 1, a polyolefin bonding adhesive layer 2, a second polyolefin polymer film 3, another polyolefin bonding adhesive layer 4, and a third polyolefin polymer film 5 that are stacked sequentially from top to bottom.

The description of the material characteristics of the first polyolefin polymer film 1, the polyolefin bonding adhesive layer 2, and the second polyolefin polymer film 3 of the second embodiment of the present disclosure is substantially the same as those of the above-mentioned first embodiment. The difference between the second embodiment of the present disclosure and the above-mentioned first embodiment is that the polyolefin packaging material 100B of the second embodiment of the present disclosure further includes the another polyolefin bonding adhesive layer 4 and the third polyolefin polymer film 5. The another polyolefin bonding adhesive layer 4 is formed on a surface of the second polyolefin polymer film 3 away from the first polyolefin polymer film 1, and the third polyolefin polymer film 5 is formed on a surface of the another polyolefin bonding adhesive layer 4 away from the first polyolefin polymer film 1.

In other words, the another polyolefin bonding adhesive layer 4 is formed between the second polyolefin polymer film 3 and the third polyolefin polymer film 5, and the another polyolefin bonding adhesive layer 4 is used to bond the second polyolefin polymer film 3 and the third polyolefin polymer film 5 together.

In terms of material characteristics, the another polyolefin bonding adhesive layer 4 can be similar to the polyolefin bonding adhesive layer 2 described in the first embodiment. The another polyolefin bonding adhesive layer 4 is also formed of a polyolefin copolymer that has been modified. The polyolefin copolymer can be, for example, formed by copolymerization of at least two kinds of C2 to C4 olefin molecules. In addition, the polyolefin copolymer that has been modified is modified by maleic anhydride. In the another polyolefin bonding adhesive layer 4, the content of the polyolefin copolymer is not less than 90 wt %. Further, a graft ratio of the maleic anhydride grafted onto the polyolefin copolymer is controlled between 0.5% and 5%. A melt index of the polyolefin copolymer is controlled between 1 g/10 min to 5 g/10 min, thereby providing excellent bonding ability and maintaining transparency.

In terms of thickness, the another polyolefin bonding adhesive layer 4 has a thickness between 2 μm and 20 μm, preferably between 3 μm and 15 μm, and more preferably between 5 μm and 10 μm.

Furthermore, in the present embodiment, the third polyolefin polymer film 5 is also a biaxially oriented polypropylene film (BOPP film). Different from the second polyolefin polymer film 3, the third polyolefin polymer film 5 is a biaxially oriented polypropylene film that has not been evaporated by inorganic materials, so that the third polyolefin polymer film 5 does not have the gas barrier properties similar to those of the second polyolefin polymer film 3. Specifically, the third polyolefin polymer film 5 has transparency, and provides increased rigidity and supportability in the polyolefin packaging material 100B.

In terms of thickness, the third polyolefin polymer film 5 has a thickness between 10 μm and 40 μm, preferably between 10 μm and 30 μm, and more preferably between 15 μm and 25 μm.

According to the above configuration, the polyolefin packaging material 100B of the second embodiment of the present disclosure can have better rigidity and supportability, and thus is more suitable for packaging materials for different products.

Third Embodiment

Figure 3:
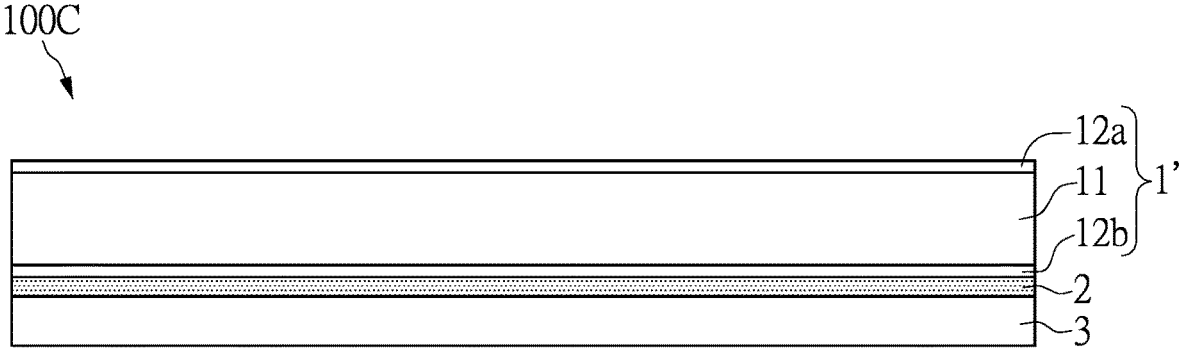
FIG. 3 is a schematic view of a polyolefin packaging material according to a third embodiment of the present disclosure.

Referring to FIG. 3, a third embodiment of the present disclosure further provides a polyolefin packaging material 100C that includes: a first polyolefin polymer film 1', a polyolefin bonding adhesive layer 2, and a second polyolefin polymer film 3 that are stacked sequentially from top to bottom.

The third embodiment of the present disclosure is substantially the same as the above-mentioned first embodiment. The difference is that the first polyolefin polymer film 1' of the second embodiment of the present disclosure is further defined as a laminated structure, which can provide better impact resistance and has more excellent moldability.

More specifically, the first polyolefin polymer film 1' includes a base film material 11, and further includes a first laminated film material 12a and a second laminated film material 12b that are respectively formed on two opposite side surfaces of the base film material 11. The first laminated film material 12a is a heat-sealing layer facing an inner side of the polyolefin packaging material 100C. The second laminated film material 12b is bonded to the polyolefin bonding adhesive layer 2. The base film material 11 is located between the first laminated film material 12a and the second laminated film material 12b.

In terms of material characteristics, a material composition of the base film material 11 includes a propylene block polymer and a polyolefin elastomer (POE). Based on a total weight of the base film material 11 being 100 wt %, a content of the propylene block polymer is between 50 wt % and 90 wt %, and preferably between 70 wt % and 90 wt %. A content of the polyolefin elastomer is between 1 wt % and 30 wt %, and preferably between 10 wt % and 30 wt %.

Further, the propylene block polymer includes blocks composed of ethylene propylene elastic rubber (EPR). A weight percent concentration of the ethylene propylene elastic rubber in the propylene block polymer is between 10% and 30%, and preferably between 15% and 20%.

It is worth mentioning that the ethylene propylene elastic rubber in the propylene block polymer needs to be within a range of the above-mentioned weight percent concentration (i.e., 10% to 30%), so that the base film material 11 can have good moldability. If the weight percent concentration of the ethylene propylene elastic rubber is lower than the above range, the base film material 11 cannot provide good moldability. On the contrary, if the weight percent concentration of the ethylene propylene elastic rubber is higher than the above range, the production yield of the propylene block polymer will be decreased.

In addition, the content of the polyolefin elastomer needs to be within the above content range (i.e., 10% to 30%) to further assist in improving the moldability of the base film material 11 and avoid the problem of impact whitening. If the content of the polyolefin elastomer is lower than the above-mentioned content range, the moldability of the base film material 11 will be deteriorated. On the contrary, if the content of the polyolefin elastomer is higher than the above-mentioned content range, the heat-sealability and transparency of the polyolefin packaging material will be deteriorated.

Referring to FIG. 3, a material composition of the first laminated film material 12a includes a homo polypropylene (homo PP) and a random polypropylene (rand PP). The homo polypropylene is a homo polymer that is polymerized from pure propylene. The random polypropylene is a random copolymer copolymerized by propylene and ethylene. The ethylene dispersed in the polymer chain of the random copolymer can reduce the degree of crystallization, so as to improve the transparency of the film material. Based on a total weight of the first laminated film material 12a being 100 wt %, a content of the homo polypropylene is between 10 wt % and 60 wt %, and preferably between 30 wt % and 60 wt %. In addition, a content of the random polypropylene is between 40 wt % and 90 wt %, and preferably between 40 wt % and 70 wt %. According to the above configuration, the first laminated film material 12a can provide good heat-sealability in packaging materials.

Similar to the above-mentioned first laminated film material 12a, a material composition of the second laminated film material 12b includes another homo polypropylene (homo PP) and another random polypropylene (rand PP). In addition, based on a total weight of the first laminated film material 12a being 100 wt %, a content of the another homo polypropylene is between 10 wt % and 60 wt %, and preferably between 30 wt % and 60 wt %. In addition, a content of the another random polypropylene is between 40 wt % and 90 wt %, and preferably between 40 wt % and 70 wt %. According to the above configuration, the second laminated film material 12b can have good bonding ability to the polyolefin bonding adhesive layer 2.

The first polyolefin polymer film 1' has a thickness between 40 μm and 120 μm, preferably between 50 μm and 110 μm, and more preferably between 60 μm and 100 μm. A thickness ratio among the first laminated film material 12a, the base film material 11, and the second laminated film material 12b is between 10:60:10 and 20:80:20. According to the above configuration, the polyolefin packaging material 100C of the third embodiment of the present disclosure can have better impact resistance, moldability, and heat sealability.

Fourth Embodiment

Figure 4:
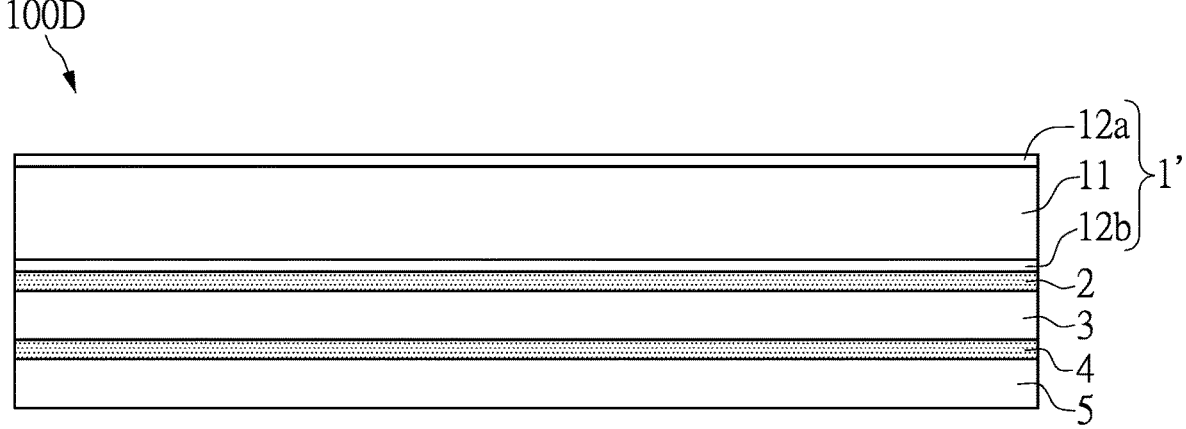
FIG. 4 is a schematic view of a polyolefin packaging material according to a fourth embodiment of the present disclosure.
Figure 5:
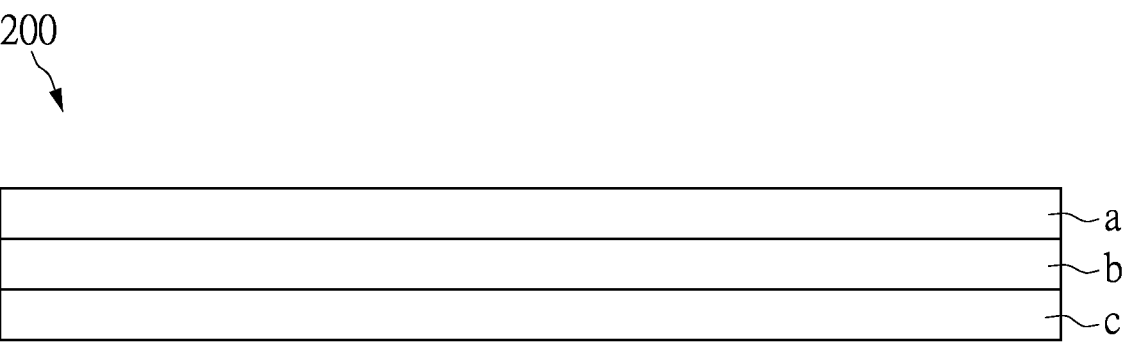
FIG. 5 is a schematic view of a conventional aluminum-plastic film packaging material in the related art.

Referring to FIG. 4, a fourth embodiment of the present disclosure further provides a polyolefin packaging material 100D that includes: a first polyolefin polymer film 1', a polyolefin bonding adhesive layer 2, a second polyolefin polymer film 3, another polyolefin bonding adhesive layer 4, and a third polyolefin polymer film 5 that are stacked sequentially from top to bottom.

The first polyolefin polymer film 1' includes: a base film material 11, and further includes a first laminated film material 12a and a second laminated film material 12b that are respectively formed on two opposite side surfaces of the base film material 11. The material characteristics of the first polyolefin polymer film 1' are similar to those described in the third embodiment above, and will not be reiterated herein. The material characteristics of the polyolefin bonding adhesive layer 2 and the second polyolefin polymer film 3 are similar to those described in the first embodiment above, and will not be reiterated herein. The material characteristics of the another polyolefin bonding adhesive layer 4 and the third polyolefin polymer film 5 are similar to those described in the second embodiment above, and will not be reiterated herein. According to the above configuration, the polyolefin packaging material 100D of the fourth embodiment of the present disclosure is another form of packaging material different from that of the first embodiment to the third embodiment, so as to meet the design requirements of different customers on product packaging materials.

Beneficial Effects of the Embodiments

In conclusion, in the polyolefin packaging material provided by the present disclosure, by virtue of "a first polyolefin polymer film being a cast polypropylene film (CPP film); a second polyolefin polymer film being a biaxially oriented polypropylene film (BOPP film); and a polyolefin bonding adhesive layer being bonded between the first polyolefin polymer film and the second polyolefin polymer film; in which the polyolefin bonding adhesive layer is formed of a polyolefin copolymer modified by maleic anhydride, the polyolefin copolymer is formed by copolymerization of at least two kinds of C2 to C4 olefin molecules, a graft ratio of the maleic anhydride grafted onto the polyolefin copolymer is between 0.5% and 5%, and a melt index of the polyolefin copolymer is between 1 g/10 min and 5 g/10 min," the polyolefin packaging material can be directly recycled and reused without undergoing special separation processes. Furthermore, the polyolefin packaging material provided by the present disclosure has the polyolefin bonding adhesive layer formed by the polyolefin copolymer modified by maleic anhydride, so that the first polyolefin polymer film (CPP film) and the second polyolefin polymer film (evaporated BOPP film) can have better bonding strength there-between, and the polyolefin packaging material can have good transparency and impact resistance, thus replacing conventional packaging materials, such as aluminum-plastic film laminates. Further, the polyolefin packaging material of the present disclosure can be applied to industrial packaging, electronic packaging, and food packaging.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A polyolefin packaging material, comprising:
a first polyolefin polymer film being a cast polypropylene film;
a second polyolefin polymer film being a biaxially oriented polypropylene film; and
a polyolefin bonding adhesive layer being bonded between the first polyolefin polymer film and the second polyolefin polymer film;
wherein the polyolefin bonding adhesive layer is formed of a polyolefin copolymer modified by maleic anhydride, the polyolefin copolymer is formed by copolymerization of propylene and 1-butylene according to a weight ratio of 40:60 to 60.40; wherein, in the polyolefin bonding adhesive layer, a content of the polyolefin copolymer is between 95 wt % and 99.5 wt %, a graft ratio of the maleic anhydride grafted onto the polyolefin copolymer is between 0.5% and 5%, and a melt index of the polyolefin copolymer is between 3.1 g/10 min and 3.4 g/10 min measured according to ASTM D1238 under the conditions of 190° C. and a load of 2.16 kg.

2. The polyolefin packaging material according to claim 1, wherein the first polyolefin polymer film has a visible light transmittance of between 80% and 99%, and a haze of between 5% and 30%.

3. The polyolefin packaging material according to claim 1, wherein the second polyolefin polymer film is the biaxially oriented polypropylene film that has undergone an evaporation process, and has a water vapor transmission rate or an oxygen transmission rate of not greater than 1 $g/m^2$ per day.

4. The polyolefin packaging material according to claim 1, wherein the first polyolefin polymer film and the second polyolefin polymer film are bonded together through the polyolefin bonding adhesive layer to have a peeling strength of not less than 4.5 N/15 mm.

5. The polyolefin packaging material according to claim 1, further comprising: another polyolefin bonding adhesive layer and a third polyolefin polymer film; wherein the another polyolefin bonding adhesive layer is formed of another polyolefin copolymer modified by maleic anhydride, and the another polyolefin bonding adhesive layer is formed on a surface of the second polyolefin polymer film away from the first polyolefin polymer film; wherein the third polyolefin polymer film is another biaxially oriented polypropylene film that has not undergone an evaporation process, and the third polyolefin polymer film is formed on a surface of the another polyolefin bonding adhesive layer away from the first polyolefin polymer film; wherein the another polyolefin bonding adhesive layer is configured to bond the second polyolefin polymer film and the third polyolefin polymer film together.

6. The polyolefin packaging material according to claim 1, wherein the first polyolefin polymer film includes a base film material, and further includes a first laminated film material and a second laminated film material that are respectively formed on two opposite side surfaces of the base film material; wherein the first laminated film material is a heat-sealing layer facing an inner side of the polyolefin packaging material, and the second laminated film material is bonded to the polyolefin bonding adhesive layer.

7. The polyolefin packaging material according to claim 6, wherein a material composition of the base film material includes a propylene block polymer and a polyolefin elastomer; wherein, based on a total weight of the base film material being 100 wt %, a content of the propylene block polymer is between 50 wt % and 90 wt %, and a content of the polyolefin elastomer is between 1 wt % and 30 wt %.

8. The polyolefin packaging material according to claim 7, wherein the propylene block polymer includes blocks composed of ethylene propylene elastic rubber, and a weight percent concentration of the ethylene propylene elastic rubber in the propylene block polymer is between 10% and 30%.

9. The polyolefin packaging material according to claim 6, wherein a material composition of the first laminated film material includes a homo polypropylene (homo PP) and a random polypropylene (rand PP); wherein the homo polypropylene is a homo polymer that is polymerized from propylene, and the random polypropylene is a random copolymer copolymerized from propylene and ethylene; wherein, based on a total weight of the first laminated film material being 100 wt %, a content of the homo polypropylene is between 10 wt % and 60 wt %, and a content of the random polypropylene is between 40 wt % and 90 wt %.

10. The polyolefin packaging material according to claim 9, wherein a material composition of the second laminated film material includes another homo polypropylene and another random polypropylene; wherein, based on a total weight of the second laminated film material being 100 wt %, a content of the another homo polypropylene is between 10 wt % and 60 wt %, and a content of the another random polypropylene is between 40 wt % and 90 wt %.

11. The polyolefin packaging material according to claim 10, wherein a thickness ratio among the first laminated film material, the base film material, and the second laminated film material is between 10:60:10 and 20:80:20.

* * * * *